Nov. 22, 1932.  J. F. DONOVAN ET AL  1,888,851
DEVICE FOR FEEDING GLASS ARTICLES
Filed Oct. 14, 1931  2 Sheets-Sheet 1
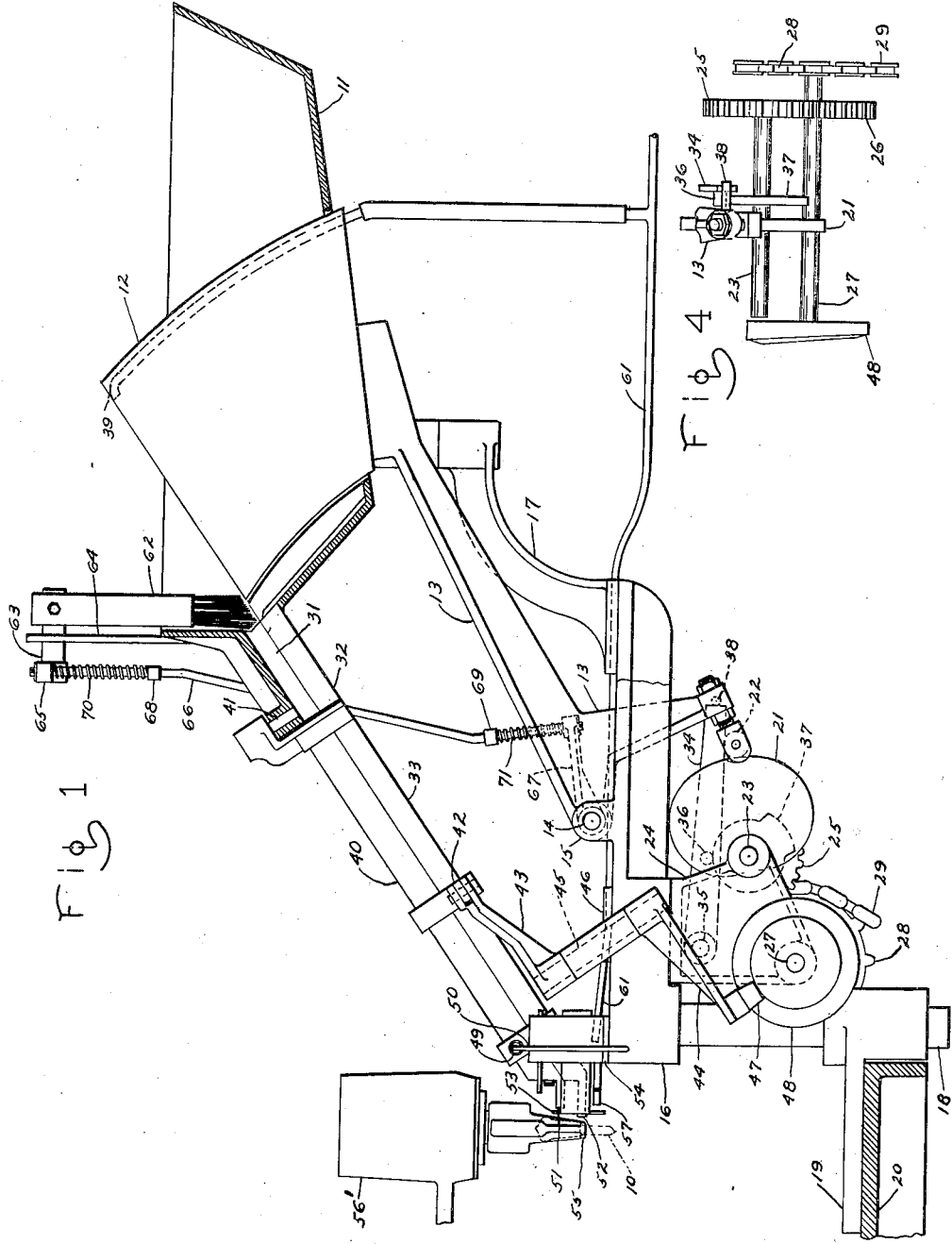
INVENTORS
JOHN F. DONOVAN
GEORGE ILLINGWORTH
BY Charles E. Mullan
THEIR ATTORNEY

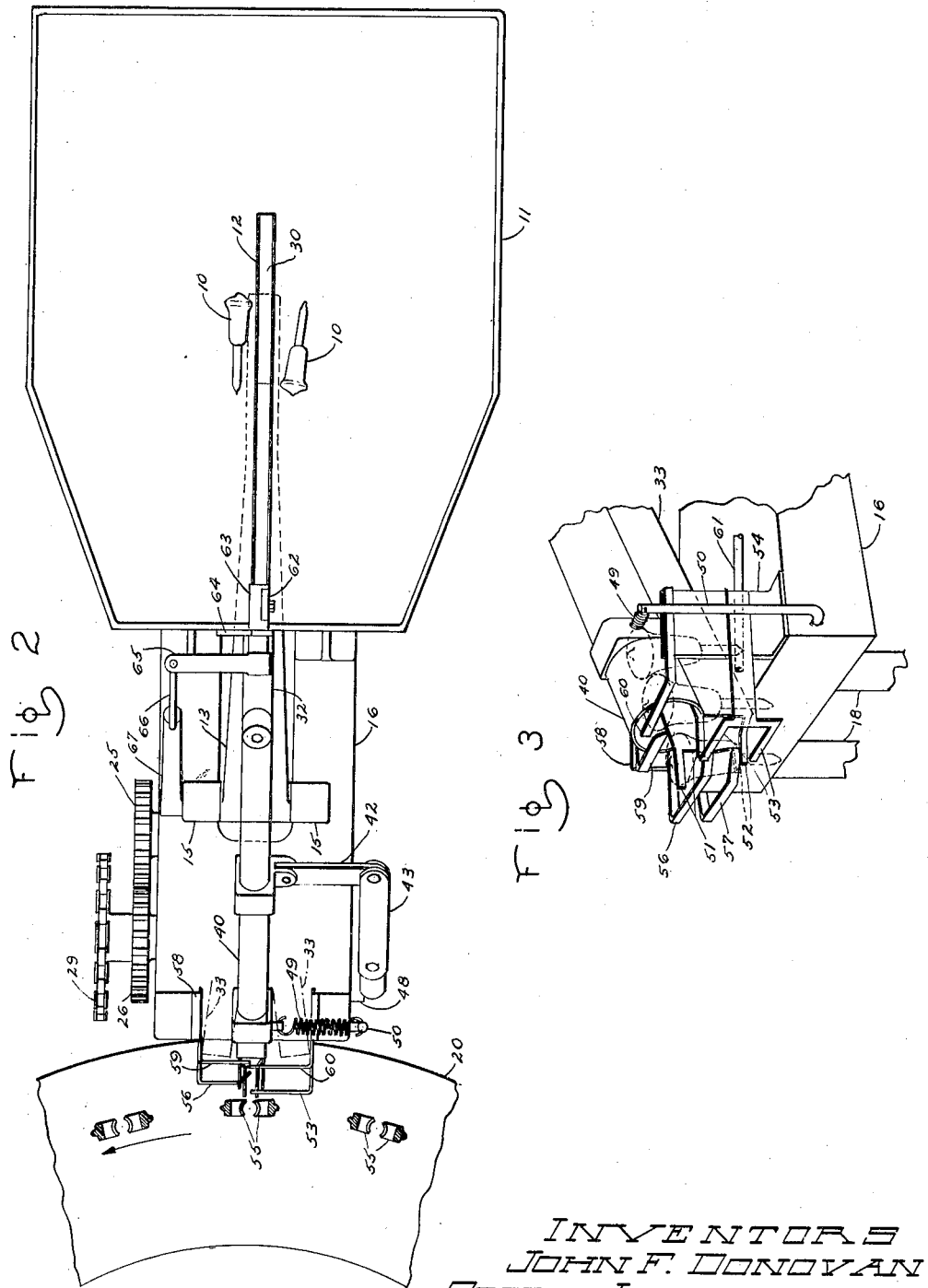

Patented Nov. 22, 1932

1,888,851

UNITED STATES PATENT OFFICE

JOHN F. DONOVAN AND GEORGE ILLINGWORTH, OF EAST CLEVELAND, OHIO, ASSIGNORS TO GENERAL ELECTRIC COMPANY, A CORPORATION OF NEW YORK

DEVICE FOR FEEDING GLASS ARTICLES

Application filed October 14, 1931. Serial No. 568,792.

Our invention relates to devices for feeding glass articles such as miniature incandescent lamp bulbs to a machine such as a bulb neck cutting machine. Its object is to provide an apparatus for uniformly feeding said parts so that they may be received, for instance by the heads of a constantly rotating machine which moves past the discharge end thereof. According to our invention, the bulbs or other similar articles, are fed onto inclined ways from a container by an oscillating segment. Escapement means are provided so that by a horizontal movement of the rails a bulb is temporarily deposited on a horizontal end portion of the rails and means are provided so that upon the return movement of the rails said bulb is guided into a clamp or holder of the neck cutting machine while retaining means prevent the downward movement of the remaining bulbs on the rails. Other features and advantages of our invention will appear from the following description of species thereof.

In the drawings, Fig. 1 is an elevation of our feeding device; Fig. 2 is a plan view thereof; Fig. 3 is a perspective of a portion of the bulb feeding means; and Fig. 4 is a diagrammatic elevation of the gear and cam assembly.

Referring now to Figs. 1 and 2 of the drawings, a quantity of bulbs 10 are placed loosely in a hopper 11 which has a slot in the bottom thereof which forms a passage for the oscillating segment 12. The segment 12 is attached to an arm 13 which is pivotally mounted on a shaft 14 carried by bearings 15 mounted on a base 16. The hopper 11 is supported by arms 17 which are also mounted on the base 16. Said base 16 is mounted on standards 18 which are adjustably mounted in a support 19 which is fastened to a stationary table 20 of the bulb neck cutting machine. The segment 12 is raised and lowered by means of a cam 21 which acts on a roller 22 on the lower part of the arm 13. The cam 21 is mounted on a shaft 23 carried by brackets 24 which are mounted on the base 16. Said cam 21 (Fig. 4) is driven through a gear 25 which meshes with a gear 26 mounted on a shaft 27 carried by the bracket 24. The shaft 27 is driven by a sprocket 28 mounted on said shaft 27 through a chain 29 from the neck cutting machine drive (not shown). The shape of the cam 21 is such that the segment 12 is alternately raised and lowered to receive bulbs and to allow their discharge. When the segment is in the lower position, its upper edge is flush with the bottom of the hopper 11. As the segment moves up it pushes its way through the bulbs 10 which fall into a channel 30 of the segment and are carried up thereby. At the top of the stroke the upper edge of the segment coincides with a groove 31 in a projection 32 of the hopper 11 which groove 31 is in line with a channel guideway 33 onto which the bulbs slide by gravity to the feeding mechanism. It sometimes happens that a piece of broken glass lodges between a side of the segment 12 and the opening in the bottom of the hopper 11 thereby holding up the segment and holding the roller 22 away from the cam 21. This wedging action may not be sufficient to continue to hold up the weight of the segment which would then crash down with possible injury to the bulbs in the hopper 11 or to some part of the mechanism. To prevent the possibility of such an occurrence a finger 34 (Figs. 1 and 4) is pivotally mounted on a pin 35 carried by the bracket 24. A pin 36 mounted in the finger 34 rides on a cam 37 mounted on the shaft 23. The leading edge of the high part of the cam 37 comes in contact with the pin 36 just before the segment 12 and arm 13 start down, thereby lifting the end of the finger 34 away from a pin 38 on the lower part of the arm 13 to allow said arm to follow down along the cam 21. The high part of the cam 37 is only long enough to hold the finger 34 away from the pin 38 until the arm 13 with segment 12 has started down. In case the segment is held up by the wedging of a piece of glass, the finger 34 drops down in front of the pin 38, thereby holding up the segment until the high part of the cam 21 again engages the roller 22. This engagement slightly raises the segment 12 which usually frees itself so that it follows down along the cam 21 on the following stroke. An air jet is provided through a length of tubing 39 to help the bulbs down the incline.

The guideway 33 along which the bulbs slide is provided with a cylindrical portion 40 to prevent the climbing of the bulbs 10 over one another. Said guideway 33 is pivotally mounted on a pin 41 carried by the projection 32 of the hopper 11 and is actuated by a link 42 through arms 43, 44 mounted on a shaft 45 carried by a bracket 46 mounted on the base 16. A follower 47 on the arm 44 is guided by a cam 48 mounted on the shaft 27 which cam is shaped so as to swing the guideway 33 alternately through the positions shown by the dot-dash lines in Fig. 2. A spring 49 mounted between the guideway 33 and a rod 50 in the base 16 serves to keep the follower 47 against the cam 48 at all times.

When the guideway 33 is at the position of the lower dot-dash lines in Fig. 2, a bulb 10 slides onto the horizontal rails 51, 52 (Fig. 3) against the fingers 53 mounted on a plate 54 fastened to the base 16. The guideway 33 then moves toward the position of the upper dot-dash lines in Fig. 2 so that it follows the jaws 55 of a holding head 56' of the bulb neck cutting machine. When the guideway 33 has reached approximately the midpoint of its travel the bulb 10 comes in contact with the bent prongs of dislodging fingers 56, 57 which guide said bulb 10 along the rails 51, 52 into the jaws 55 of the holding head 56'. The fingers 56, 57 are mounted on a plate 58 fastened to the base 16. A finger 59 also mounted in plate 58 holds back the row of bulbs 10 in the guideway 33 while the foremost bulb is being fed to the jaws 55. It sometimes happens that a bulb sliding on to the rails 51, 52 tends to be pushed up by the bulb behind, which results in the breakage of said bulb during further movement of the rails. To prevent this climbing action, a finger 60 is provided to hold down the bulb, being mounted on the plate 54. The particular shape of bulb shown, being top heavy, tends to enter the rails 51, 52 with the top foremost and the stem portion trailing. Such a position would also cause breakage of the bulb, so a jet of air is provided through a tube 61 which impinges on the stem of the foremost bulb, thus keeping it in a substantially vertical position.

A brush 62 sweeps across the top of channel 31 in the hopper 11 to dislodge any bulbs which might lie across and obstruct said channel. The brush is mounted on a shaft 63 carried by an arm 64 mounted on the hopper 11. An arm 65 mounted on the shaft 63 is rocked through a rod 66 by an arm 67 mounted on the shaft 14. The rod 66 is resiliently mounted between the arms 65 and 67 and collars 68, 69 respectively on said rod 66, by springs 70 and 71.

What we claim as new and desire to secure by Letters Patent of the United States is:

1. A feeding apparatus comprising a guideway disposed to allow the feeding of articles therealong by gravity, means for oscillating said guideway in a substantially horizontal plane and escapement means for allowing the discharge of said articles one by one in predetermined time relation with the movements of said guideway comprising stationary fingers oppositely disposed so as to engage said articles at different positions of said guideway.

2. A feeding apparatus comprising a guideway disposed to allow the feeding of articles therealong by gravity, means for oscillating said guideway in a substantially horizontal plane and escapement means for allowing the discharge of said articles one by one in predetermined time relation with the movements of said guideway comprising stationary fingers oppositely disposed so as to engage said articles at different positions of said guideway and a finger disposed to retain the rest of the said articles in said guideway while the lowermost article is discharged therefrom.

3. A feeding apparatus comprising a downwardly inclined guideway mounted to allow horizontal movement thereof and having substantially horizontally disposed rails at the bottom thereof, stationary means comprising a finger against which the lowermost article impinges, stationary means comprising an inclined finger for dislodging said article, a stationary finger for retaining the rest of the row of articles in said guideway during the discharge of the lowermost article and means for oscillating said guideway to cause the discharge of said articles one by one from said apparatus.

4. A feeding device for fragile articles comprising a hopper, a downwardly inclined guideway leading from said hopper, a segment mounted to oscillate in said hopper having a portion thereof shaped to receive said articles and to allow them to be delivered to said guideway when said segment reaches a predetermined position, means comprising a cam and cooperating arm for oscillating said segment and means for preventing the dropping of said segment after an interruption in its movement comprising a finger movable to positions in or out of engagement with said arm and a cam for moving said finger.

In witness whereof, we have hereunto set our hands.

JOHN F. DONOVAN.
GEORGE ILLINGWORTH.